US010536040B2

(12) United States Patent
Lee et al.

(10) Patent No.: US 10,536,040 B2
(45) Date of Patent: Jan. 14, 2020

(54) CONTROL METHOD FOR WIRELESS POWER TRANSFER APPARATUS CONSIDERING INTERFERENCE IN WIRELESS POWERED COMMUNICATION NETWORKS, AND WIRELESS POWER TRANSFER APPARATUS

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Ji Hyoung Ahn, Suwon-si (KR); Seung Yong Jeon, Ansan-si (KR); Min Young Chung, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 350 days.

(21) Appl. No.: 15/629,129

(22) Filed: Jun. 21, 2017

(65) Prior Publication Data
US 2017/0373725 A1 Dec. 28, 2017

(30) Foreign Application Priority Data

Jun. 22, 2016 (KR) .................. 10-2016-0077715
May 23, 2017 (KR) .................. 10-2017-0063508

(51) Int. Cl.
*H02J 50/80* (2016.01)
*H04B 5/00* (2006.01)
(Continued)

(52) U.S. Cl.
CPC .............. *H02J 50/80* (2016.02); *H02J 50/10* (2016.02); *H04B 1/1027* (2013.01);
(Continued)

(58) Field of Classification Search
CPC ..... H04B 5/0037; H04B 1/1027; H02J 50/80; H02J 50/00; H02J 50/10; H04W 84/12; H04W 88/021; H04W 74/0808
(Continued)

(56) References Cited

U.S. PATENT DOCUMENTS

2010/0142423 A1\* 6/2010 Zhu .................. G08C 17/02
370/311

FOREIGN PATENT DOCUMENTS

KR 10-1531394 B1 6/2015
KR 10-1579705 B1 12/2015
(Continued)

OTHER PUBLICATIONS

Won Jin Lee, et al., "A Mechanism on Energy Harvesting and Data Communications in Wi-Fi Network," *Proceedings of 10th International Conference on Ubiquitous Information Management and Communication*, Article No. 57, Danang, Vietnam, Jan. 2016 (6 pages, in English).

*Primary Examiner* — Carlos Amaya
(74) *Attorney, Agent, or Firm* — NSIP Law

(57) ABSTRACT

Provided are a control method for a wireless power transfer apparatus considering interference in wireless powered communication networks, and a wireless power transfer apparatus. The control method of the wireless power transfer apparatus includes: performing, by at least one wireless power transfer apparatus, a distributed coordination function (DCF) based contention process with at least one wireless communication terminal; and transmitting, by the wireless power transfer apparatus which won in the DCF based contention process, an energy frame to the at least one wireless communication terminal.

24 Claims, 9 Drawing Sheets

(51) Int. Cl.
  *H04B 1/10* (2006.01)
  *H04W 84/12* (2009.01)
  *H04W 88/02* (2009.01)
  *H02J 50/10* (2016.01)
  *H04W 74/08* (2009.01)

(52) U.S. Cl.
  CPC .......... *H04B 5/0037* (2013.01); *H04W 84/12* (2013.01); *H04W 88/021* (2013.01); *H04W 74/0808* (2013.01)

(58) Field of Classification Search
  USPC ........................................................ 307/104
  See application file for complete search history.

(56) References Cited

FOREIGN PATENT DOCUMENTS

KR    10-1617127 B1    4/2016
KR    10-1627465 B1    6/2016

* cited by examiner

CONTROL METHOD FOR WIRELESS POWER TRANSFER APPARATUS CONSIDERING INTERFERENCE IN WIRELESS POWERED COMMUNICATION NETWORKS, AND WIRELESS POWER TRANSFER APPARATUS

CLAIM FOR PRIORITY

This application claims priority to and the benefit of Korean Patent Application No. 10-2016-0077715 filed in the Korean Intellectual Property Office on Jun. 22, 2016 and Korean Patent Application No. 10-2017-0063508 in the Korean Intellectual Property Office on May 23, 2017, the entire contents of which are incorporated herein by reference.

BACKGROUND

1. Technical Field

The present invention relates to wireless power transfer, and more particularly, to wireless power transfer in wireless powered communication networks.

2. Related Art

A wireless powered communication network refers to a network in which wireless power transfer apparatuses supplying energy through wireless power transfer and wireless communication terminals coexist.

In general, in the wireless powered communication network, when the wireless power transfer apparatus uses the same frequency band as a wireless communication system such as Wi-Fi, the wireless power transfer apparatuses, unlike the wireless communication terminals, transfer a power signal without checking whether a channel is used. Therefore, there is a problem that the power signal of the wireless power transfer apparatus interferes with the wireless communication system to interfere with wireless communication.

Since each wireless communication terminal may perform communication only while the wireless medium is in an idle state, the transfer of the power signal of the wireless power transfer apparatus causes performance degradation of the wireless communication network.

As one example, there is a wireless power transfer system that supplies power to multiple terminals at a distance of several meters by using a frequency of the same unlicensed/individual scientific and medical (ISM) band as an IEEE 802.11 based wireless communication system.

In the case of carrier sense multiple access/collision avoidance (CSMA/CA), which is a medium access control (MAC) technology used in the IEEE 802.11 based wireless network, the terminal may perform the communication only while other terminals or apparatuses do not use the wireless medium by detecting the wireless medium. Accordingly, in the wireless powered communication network in which the wireless power transfer apparatuses using the same frequency band as the terminals of the wireless communication network exist, the wireless power transfer apparatuses interfere with the communication of the wireless communication network.

In a CSMA/CA based distributed coordination function (DCF) protocol, the terminal or an access point (AP) continuously detects a channel state before transferring data. When it is detected that the channel is in the idle state for a DIFS (DCF interframe space) time, the terminals attempt to transfer data through random backoff contention. Each of the terminals selects a random number within a contention window value range and uses the selected random number as a backoff value. When the channel is in the idle state, each terminal reduces the selected backoff value by 1 for each backoff slot. When the channel is in a busy state through transfer by a specific terminal(s), terminals which do not occupy the channel detect the busy state and stop the reduction of the backoff value. A terminal in which the backoff value reaches 0 attempts to transmit data. If normal reception is not possible due to a channel error or simultaneous transmission by two or more terminals, a receiving terminal does not send an acknowledgment. When the transmitting terminal does not receive the acknowledgement from the receiving terminal within a predetermined time, the transmitting terminal regards that the transmission is unsuccessful and increases the contention window value of the terminal by two times until the contention window value reaches a maximum contention window value. Such a process is repeated until reaching the maximum number of retransmission times.

A basic access method or a ready to send/clear to send (RTS/CTS) access method may be used in order to transmit a data frame by the DCF.

In the basic access method, when there is the terminal in which the backoff value reaches 0, the corresponding terminal immediately transmits the data. When the terminal succeeds in transmitting the data, the receiving terminal transmits an acknowledgement (ACK) frame after a short interframe space (SIFS) time. When the channel is in the idle state for the DIFS time after transmitting the ACK, the terminals attempt to transmit the data while reducing the backoff value again.

In the RTS/CTS access method, the terminal in which the backoff value reaches 0 transmits RTS. When the terminal succeeds in transmitting the RTS, the RTS receiving terminal transmits the CTS after the SIFS time. Other peripheral terminals that receive the RTS and the CTS do not perform data transmission thereof for a predetermined time. After the RTS transmitting terminal transmits the data to the RTS receiving terminal, the data receiving terminal transmits the ACK and thereafter, RTS/CTS and data transmission processes of the terminals are repeated.

In the basic access method, when two or more terminals collide with each other by transmitting the data, the channel is in the busy state for a data transmission time. On the contrary, in the RTS/CTS access method, when the collision occurs, the channel is in the busy state only for an RTS transmission time due to the RTS collision. Therefore, in the RTS/CTS access method, a whole channel busy time until successfully transmitting the data is a little shorter than the basic access method, but an actual channel busy time is short to reduce a wasted time when the collision occurs.

FIG. 1 is a diagram illustrating an example of a data and wireless power transfer process in wireless powered communication networks to which the related art (RTS/CTS access method) is applied. In FIG. 1, a situation is assumed, in which when the number of terminals is three ($S_1$, $S_2$, and $S_3$) and the number of wireless power transfer apparatuses is one, data and power are transferred in the existing wireless power communication network. The terminals $S_1$, $S_2$, and $S_3$ attempt to transmit the data to the AP through contention when the channel is in the idle state, but the wireless power transfer apparatus transfers the power signal immediately without checking whether the channel is idle/busy. Accordingly, since the RTS transmitted by the terminal $S_3$ in which the backoff value reaches 0 and an energy signal transmitted by the wireless power transfer apparatus are simultaneously transmitted to interfere with each other, the interference occurs, and as a result, a problem may occur, in which communication is not successful.

SUMMARY

According to an aspect of the present invention, in a wireless powered communication network environment, interference is removed and performance of a wireless powered communication network is improved by considering problems which may occur when a wireless power transfer apparatus and a wireless communication system coexist. Further, an aspect of the present invention provides a control method of a wireless power transfer apparatus, in which a wireless power transfer apparatus is capable of efficiently supplying power by considering a residual energy amount of a terminal, and the wireless power transfer apparatus. Additionally, an aspect of the present invention provides a control method of a wireless power transfer apparatus for minimizing an amount of a data communication time of a wireless communication system, which is reduced due to busy of a channel used when the wireless power transfer apparatus supplies power and the wireless power transfer apparatus.

According to an aspect of the present invention, a control method for a wireless power transfer apparatus considering interference in wireless powered communication networks is provided. The control method of the wireless power transfer apparatus includes: performing, by at least one wireless power transfer apparatus, a DCF based contention process with at least one wireless communication terminal; and transmitting, by the wireless power transfer apparatus which won in the DCF based contention process, an energy frame to the at least one wireless communication terminal.

The control method of the wireless power transfer apparatus may further include: transmitting, by the wireless power transfer apparatus which won in the DCF based contention process, an energy request-to-send (ERTS) frame to an AP; and receiving, by the wireless power transfer apparatus which won in the DCF based contention process, an energy clear-to-send (ECTS) frame from the AP which received the ERTS frame.

The control method of the wireless power transfer apparatus may further include switching, by the at least one wireless communication terminal which received at least one of the ERTS frame and the ECTS frame, a data transmission mode into an energy reception mode.

The control method of the wireless power transfer apparatus may further include transferring, by the wireless power transfer apparatus receiving the ECTS, power to the at least one wireless communication terminal.

According to another aspect of the present invention, a control method for a wireless power transfer apparatus considering interference in wireless powered communication networks, includes: determining, by at least one wireless power transfer apparatus, a residual energy state of at least one wireless communication terminal by a beacon frame which an AP periodically receiving the residual energy state from at least one wireless communication terminal periodically broadcasts; performing, by the at least one wireless power transfer apparatus, a DCF based contention process with the at least one wireless communication terminal only when residual energy of all of the at least one wireless communication terminal is not more than a predetermined high threshold; and determining, by the wireless power transfer apparatus which won in the DCF based contention process, a power transfer mode according to the residual energy state of the at least one wireless communication terminal.

In the determining of the power transfer mode, when at least one wireless communication terminal in which residual energy is less than a low threshold exists among the one or more wireless communication terminals, the power transfer mode may be determined as an energy unicast mode and when the residual energy of all of the one or more wireless communication terminals is equal to or more than the low threshold and equal to or less than a high threshold, the power transfer mode may be determined as an energy broadcast mode.

The control method of the wireless power transfer apparatus may further include: transmitting, by the wireless power transfer apparatus which won in the DCF based contention process, an ERTS frame to an AP before transferring power; and receiving, by the wireless power transfer apparatus which won in the DCF based contention process, an ECTS frame from the AP which received the ERTS frame.

The at least one wireless power transfer apparatus may estimate a channel busy state $\tilde{D}_i$ by the at least one wireless communication terminal based on the following equation $\tilde{D}_i = \alpha \tilde{D}_{i-1} + (1-\alpha) D_i$ (in this case, a weighted value $\alpha$ is a real number between 0 and 1) and the at least one wireless power transfer apparatus may perform the DCF based contention process with the at least one wireless communication terminal only when the $\tilde{D}_i$ value is smaller than a predetermined minimum threshold.

The control method of the wireless power transfer apparatus may further include transmitting, by residual wireless power transfer apparatuses other than the wireless power transfer apparatus which won in the DCF based contention among the one or more wireless power transfer apparatuses, an energy frame to at least one wireless communication terminal simultaneously with the wireless power transfer apparatus which won in the DCF based contention process by detecting the ERTS frame and ECTS frame exchange.

According to yet another aspect of the present invention, a control method for a wireless power transfer apparatus considering interference in wireless powered communication networks, includes: confirming, by at least one wireless power transfer apparatus, residual energy of at least one wireless communication terminal; determining, by the at least one wireless power transfer apparatus, whether a wireless communication terminal in which the residual energy is equal to or less than a high threshold exists; estimating, by the at least one wireless power transfer apparatus, an idle or busy state of a channel when the wireless communication terminal in which the residual energy is equal to or less than the high threshold exists; performing, by the at least one wireless power transfer apparatus, a DCF based contention process with the at least one wireless communication terminal when the channel is in the idle state; determining, by a wireless power transfer apparatus which won in the DCF based contention process, whether a wireless communication terminal in which the residual energy is less than a low threshold exists; determining, by the wireless power transfer apparatus which won in the DCF based contention process, a power transfer mode as an energy unicast mode when wireless communication terminal in which the residual energy is less than the low threshold exists; and determining, by the wireless power transfer apparatus which won in the DCF based contention process, a power transfer mode as an energy broadcast mode when wireless communication terminal in which the residual energy is less than the low threshold does not exist.

According to still yet another aspect of the present invention, a wireless power transfer apparatus is provided. The wireless power transfer apparatus includes: a communication module selecting any integer within a contention window and selecting the selected integer as a backoff value to perform a DCF contention based process with one or more wireless communication terminal; a power transfer module transmitting an energy frame to at least one of the one or more wireless communication terminals when wining in the DCF based contention process; and a processor controlling the communication module and the power transfer module.

The communication module may include a wireless medium detecting unit checking whether a channel is in an idle state before performing the DCF based contention process, a DCF contention executing unit executing the DCF based contention process, and a control frame transmitting/receiving unit transmitting ERTS to a wireless communication terminal or an AP and receiving at least one of ECTS and an energy ACK (Energy Acknowledge, EACK) frame from the wireless communication terminal or the AP.

The power transfer module may include an energy frame generating unit generating an energy frame to be transmitted to at least one wireless communication terminal, and an energy frame transmitting unit transmitting the energy frame to at least one wireless communication terminal.

The processor may include a control frame/energy frame control unit determining a power transfer mode—the power transfer mode including an energy unicast mode and an energy broadcast mode, a terminal residual energy detecting unit detecting a residual energy state of at least one wireless communication terminal by beacon frame information received from the AP, and a channel idle/busy state estimating unit determining whether the channel is in the idle state based on a previous communication record of the at least one wireless communication terminal.

The control frame/energy frame control unit may determine the power transfer mode as the energy unicast mode when at least one wireless communication terminal in which residual energy is less than a low threshold exists among one or more wireless communication terminals as a result of detecting the residual energy state of the terminal residual energy detecting unit and determine the power transfer mode as the energy broadcast mode when the residual energy of all of one or more wireless communication terminals is equal to or more than the low threshold and equal to or less than the high threshold.

The control frame/energy frame control unit may transfer to the control frame transmitting/receiving unit an address of a wireless communication terminal—a wireless communication terminal having the lowest residual energy among the wireless communication terminals in which the residual energy is less than the low threshold—which will receive the power when the power transfer mode is the energy unicast mode and transfers the address of the AP to the control frame transmitting/receiving unit when the power transfer mode is the energy broadcast mode.

When the control frame transmitting/receiving unit is not able to receive the ECTS frame within a predetermined time after transmitting the ERTS frame to the wireless communication terminal or the AP which will receive the power, the control frame transmitting/receiving unit may notify that control frame exchange is unsuccessful to the DCF contention executing unit and the wireless medium detecting unit in order to attempt to access a wireless medium again.

When the control frame transmitting/receiving unit receives an energy ACK frame from the wireless communication terminal or the AP which will receive the power within a predetermined time, the control frame transmitting/receiving unit may notify that energy frame transmission is successfully completed to at least one of the processor, the DCF contention executing unit, and the power transfer module and when the control frame transmitting/receiving unit is not able to receive the energy ACK frame within the predetermined time, the control frame transmitting/receiving unit may notify that the energy frame transmission is unsuccessful to at least one of the processor, the DCF contention executing unit, and the power transfer module.

The channel idle/busy state estimating unit may estimate a channel busy state $\tilde{D}_i$ by the at least one wireless communication terminal based on the following equation $\tilde{D}_i = \alpha \tilde{D}_{i-1} + (1-\alpha) D_i$ (in this case, a weighted value $\alpha$ is a real number between 0 and 1) and estimate a case where the $\tilde{D}_i$ value is smaller than a predetermined minimum threshold as an idle state and estimates other cases as the busy state.

According to an aspect of the present invention, provided are a control method of a wireless power transfer apparatus, which is used for the wireless power transfer apparatus to solve a problem in which the wireless power transfer apparatus causes interference during data and wireless power transfer processes and efficiently transferring power to wireless communication terminals, and the wireless power transfer apparatus. Therefore, the interference may be reduced and a throughput of a wireless powered communication network may be improved. That is, when wireless communication terminals and wireless power transfer apparatuses perform data and wireless power transfer in a wireless powered communication network environment by using the control method, the terminals may not be interfered by the wireless power transfer of the wireless power transfer apparatuses operating in the same channel. Further, since the terminal may save a time required for charging energy by simultaneously receiving the energy from multiple wireless power transfer apparatuses, the throughput of a network may be improved.

Further, the control method allows the wireless power transfer apparatus to effectively transfer the energy to all wireless communication terminals according to energy states of the wireless communication terminals. Additionally, the wireless power transfer apparatus determines a channel idle/busy state to supply the power to the terminals without significantly reducing an amount of a data communication time of the wireless communication terminal.

BRIEF DESCRIPTION OF DRAWINGS

Features and advantages of the present invention become apparent from the following detailed description which is based on the accompanying drawings. In the accompanying drawings.

DESCRIPTION OF EXAMPLE EMBODIMENTS OF THE PRESENT INVENTION

Figure 1:
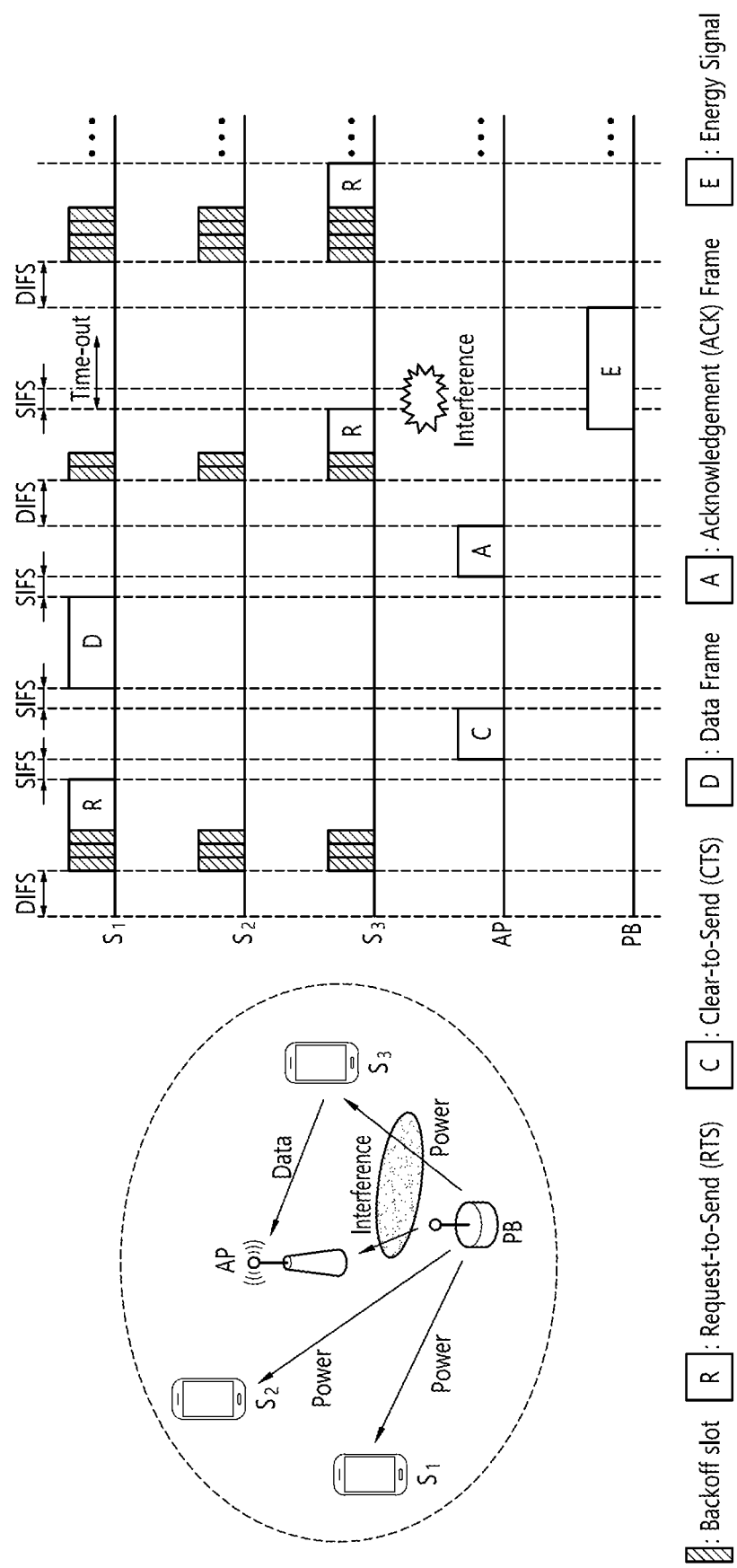
FIG. 1 is a diagram illustrating one example of a wireless power transfer process to which the related art is applied.

The present invention may have various modifications and various embodiments and specific embodiments will be illustrated in the drawings and described in detail in the detailed description. However, this does not limit the present invention to specific embodiments, and it should be understood that the present invention covers all the modifications, equivalents and replacements included within the idea and technical scope of the present invention.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

When it is described that a component is "connected to" or "accesses" another component, the component may be directly connected to or access the other component or a third component may be present there between. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

A terminal may be referred to as a mobile station (MS), user equipment (UE), a user terminal (UT), a wireless terminal, an access terminal (AT), a fixed or mobile subscriber unit, a subscriber station (SS), a cellular phone, a wireless device, a wireless communication device, a wireless transmit/receive unit (WTRU), a mobile node, a mobile, a mobile station, a personal digital assistant (PDA), a smart phone, a laptop, a netbook, a personal computer, a wireless sensor, a consumer electronic device (CE), or other terms.

Various embodiments of the terminal may include the cellular phone, the smart phone having a wireless communication function, the personal digital assistant (PDA) having the wireless communication function, a wireless modem a portable computer having the wireless communication function, a photographing device such as a digital camera having the wireless communication function, a wearable device having the wireless communication function, a gaming device having the wireless communication function, music storing and playing home appliances having the wireless communication function, Internet home appliances capable of wireless Internet access and browsing, and portable units or terminals integrating combinations of the functions, but are not limited thereto.

Hereinafter, preferred embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

According to an embodiment of the present invention, the present invention provides a method that controls a wireless power transfer apparatus in order to reduce interference which power signal transmission of the wireless power transfer apparatus exerts with a wireless communication system when the wireless power transfer apparatus and the wireless communication system use the same frequency band in wireless powered communication networks.

First, in the present invention, in order to solve a problem that the power signal transmission of the wireless power transfer apparatus interferes in the wireless communication system, the wireless power transfer apparatus joins DCF based contention like wireless communication terminals.

When the wireless communication terminal won in the contention, the wireless communication terminal performs data frame transmission like the existing wireless communication system. On the contrary, when the wireless power transfer apparatus won in the contention, the wireless power transfer apparatus transfers power for a predetermined time and other wireless communication terminals are switched from a data transmission mode into an energy reception mode to receive the transmitted power signal.

In this case, in order to distinguish a data transmitting operation of the wireless communication terminal and a power transfer operation of the wireless power transfer apparatus from each other, each of the wireless communication terminal and the wireless power transfer apparatus performs data request-to-send/data clear-to-send (DRTS/DCTS) and ERTS/ECTS exchanges before transferring the data or power. The power signal which the wireless power transfer apparatus transmits for a predetermined time is defined as an energy frame which is a concept corresponding to a data frame in order to distinguish the power signal from the data frame of a communication system.

The wireless communication terminal or an AP that receives the DRTS receives the data after transmitting the DCTS. The AP that receives the ERTS transmits the ECTS and the wireless communication terminal receives the energy frame. In addition, a receiving terminal or the AP responds to the wireless communication terminal or the wireless power transfer apparatus which transmits the DRTS or ERTS as data ACK or energy ACK.

Figure 2:
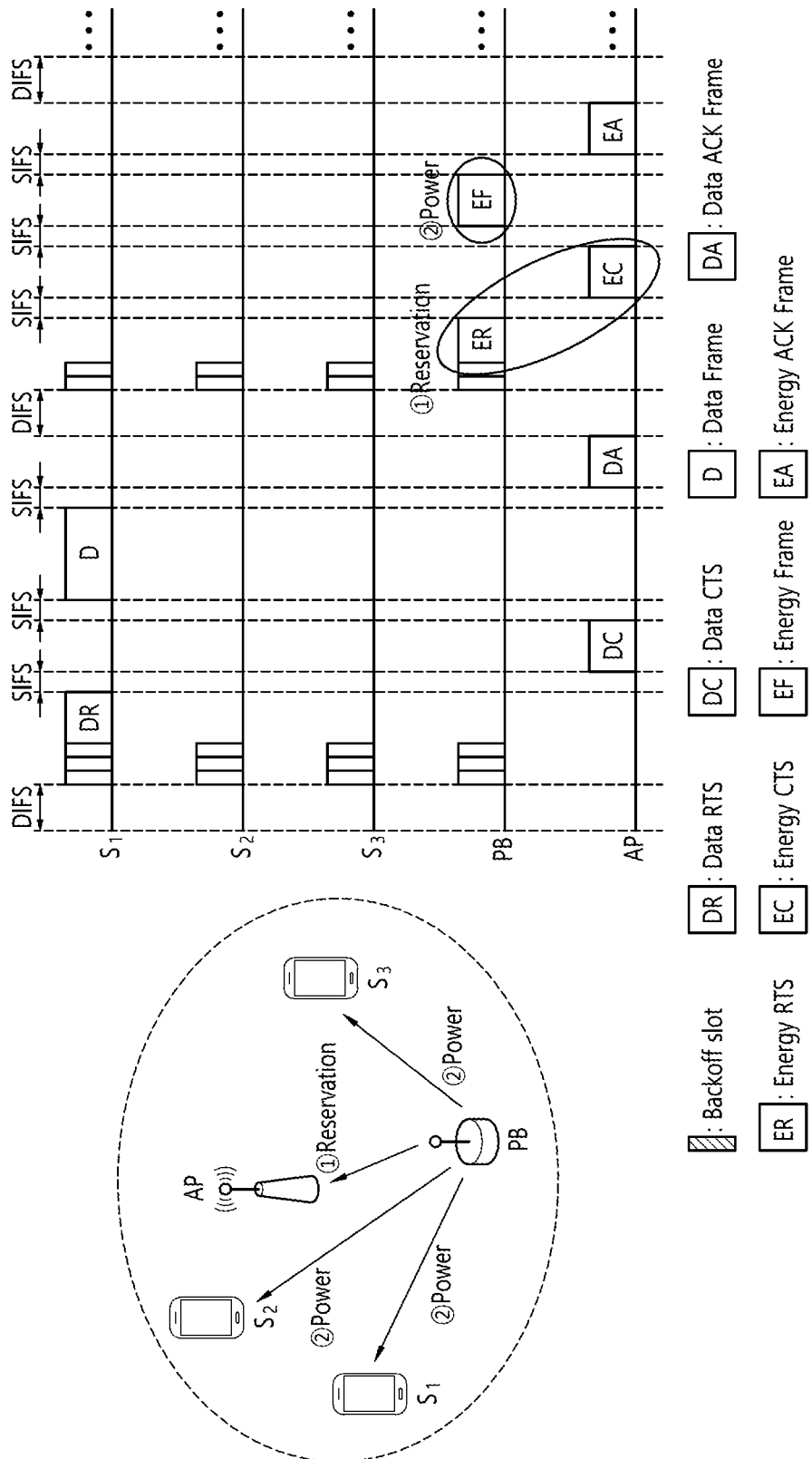
FIG. 2 is a diagram illustrating a data and wireless power transfer process according to an embodiment of the present invention.

FIG. 2 is a diagram illustrating data and wireless power transfer processes according to an embodiment of the present invention. Referring to FIG. 2, the number of communication terminals, $N_{STA}$ is 3 and the number of wireless power transfer apparatuses, $N_{PE}$ is 1. The terminals $S_1$, $S_2$, and $S_3$ and the wireless power transfer apparatus PB content with each other based on a DCF in order to transmit data or an energy frame to the AP. The terminal and the wireless power transfer apparatus checks that a channel is in an idle state for DIFS and starts DCF based contention. When a backoff value of $S_1$ reaches 0, the data is transmitted after the DRTS/DCTS are exchanged. Next, when the backoff value of PB reaches 0, the ERTS/ECTS exchange corresponding to the DRTS/DCTS exchange is performed with the AP before transmitting the energy frame and terminals that receive ERTS/ECTS is switched from a data transmission mode to an energy reception mode. Other terminals, base stations, and wireless power transfer apparatuses may also receive the ERTS/ECTS due to a characteristic of wireless communication using radio waves. The wireless power transfer apparatus that receives an ECTS frame transfers power to the terminals.

According to another aspect of the present invention, the present invention provides a method for transferring the power according to residual energy states of wireless communication terminals by detecting residual energy amounts of the wireless communication terminals so as to supply appropriate power by considering the energy amount of the wireless communication terminal.

The wireless power transfer apparatus may determine the residual energy states of the terminals by a beacon frame periodically broadcasted by the AP. First, the terminals periodically transmit residual energy state information thereof to the AP. The AP broadcasts the beacon frame containing the collected residual energy state information of the terminals and the wireless power transfer apparatus receives the broadcasted beacon frame. When the wireless power transfer apparatus won in the contention, a terminal in which residual energy is less than a low threshold $E_L$ individually transfers the power to the corresponding terminal like unicast through a beamforming technology to concentrate the transferred power on a specific terminal. When two or more terminals in which the residual energy is less than the low threshold $E_L$ are provided, the power is transferred to a terminal having a lowest energy state among the terminals. In addition, when the residual energy of the terminals is between the low threshold $E_L$ and a high threshold $E_H$, the wireless power transfer apparatus may transfer the power in a mode such as broadcast. When the residual energy of the terminals is more than the high threshold $E_H$, the wireless power transfer apparatus does not transfer the power any longer.

Figure 3:
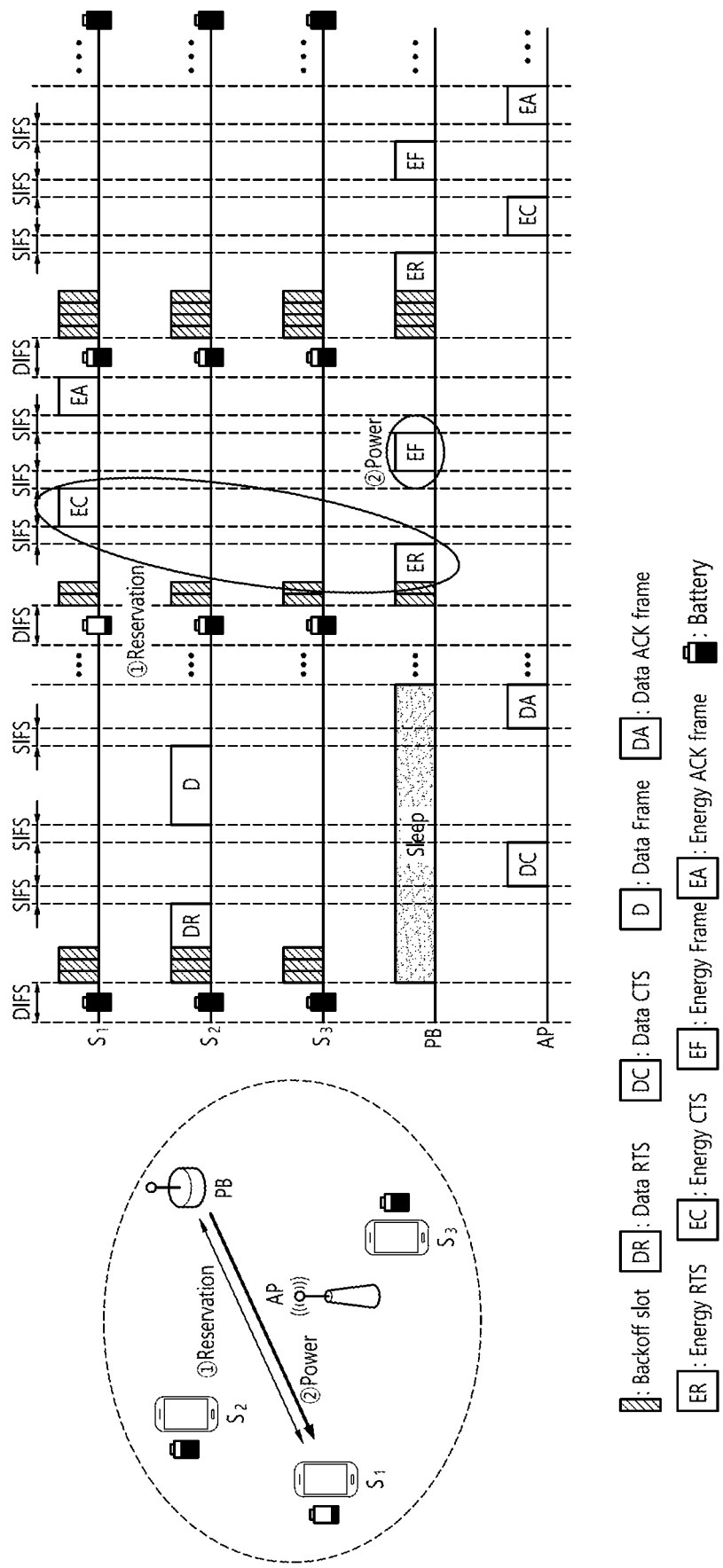
FIG. 3 is a diagram illustrating a wireless data and power transfer process when a terminal in which residual energy is short exists according to the embodiment of the present invention.

FIG. 3 is a diagram illustrating a data and wireless power transfer process when a terminal in which residual energy is short exists according to the embodiment of the present invention. Referring to FIG. 3, since the residual energy of all of the terminals $S_1$, $S_2$, and $S_3$ is more than the high threshold $E_H$ in first contention, the wireless power transfer apparatus does not operate. Since a terminal $S_1$ in which the residual energy is less than the low threshold $E_L$ is provided in second contention, PB concentrates and transfers the energy onto the corresponding terminal in the unicast mode.

Last, when PB acquires a transmission opportunity in third contention, the residual energy of all terminals is between $E_L$ and $E_H$, PB transfers the energy to the terminals in the broadcast mode.

According to yet another aspect of the present invention, provided is a method in which the wireless power transfer apparatus of the present invention concentratively transfers the energy frame to the terminals when channel busy states by the terminals are in the idle state if possible. This method may reduce an influence exerted on the communication time of the communication terminals due to transmission of the ERTS, the ECTS, the energy frame, and the like for wireless power transfer.

Since a throughput of the network is a ratio of a time when a data frame is transmitted to a total operation time, when the wireless power transfer apparatus transfers the energy frame, the wireless communication terminal may not transmit the data frame for the corresponding time, and as a result, the throughput of the network decreases. Accordingly, when the wireless power transfer apparatus supplies the power by using a period in which the channel busy state by the wireless communication terminals is in the idle state, the power may be effectively transferred without significantly reducing the data communication time of the wireless communication terminal.

To this end, in the present invention, the wireless power transfer apparatus estimates the channel busy states by the terminals based on previous data communication records of the terminals. That is, when the number of data communication times per time during a predetermined section is smaller than a previously defined minimum threshold $D_{thr}$, it is estimated that the channel is in the idle state. When the number of data communication times of the terminal for a i-th slot time is referred to as $D_i$, the average number of data communication times which is estimated up to the i-th slot time is described below.

$$\tilde{D}_i = \alpha \tilde{D}_{i-1} + (1-\alpha) D_i \qquad \text{[Equation 1]}$$

In this case, a weighted value $\alpha$ is a real number between 0 and 1.

When it is estimated that the channel is in the idle state because $\tilde{D}_i$ is smaller than the minimum threshold $D_{thr}$, the wireless power transfer apparatus attempts to transfer the power through the DCF based contention. However, when it is estimated that the channel is in the idle state because $\tilde{D}_i$ is equal or larger than the minimum threshold $D_{thr}$, the wireless power transfer apparatus does not attempt to transfer the power through the DCF based contention.

Figure 4:
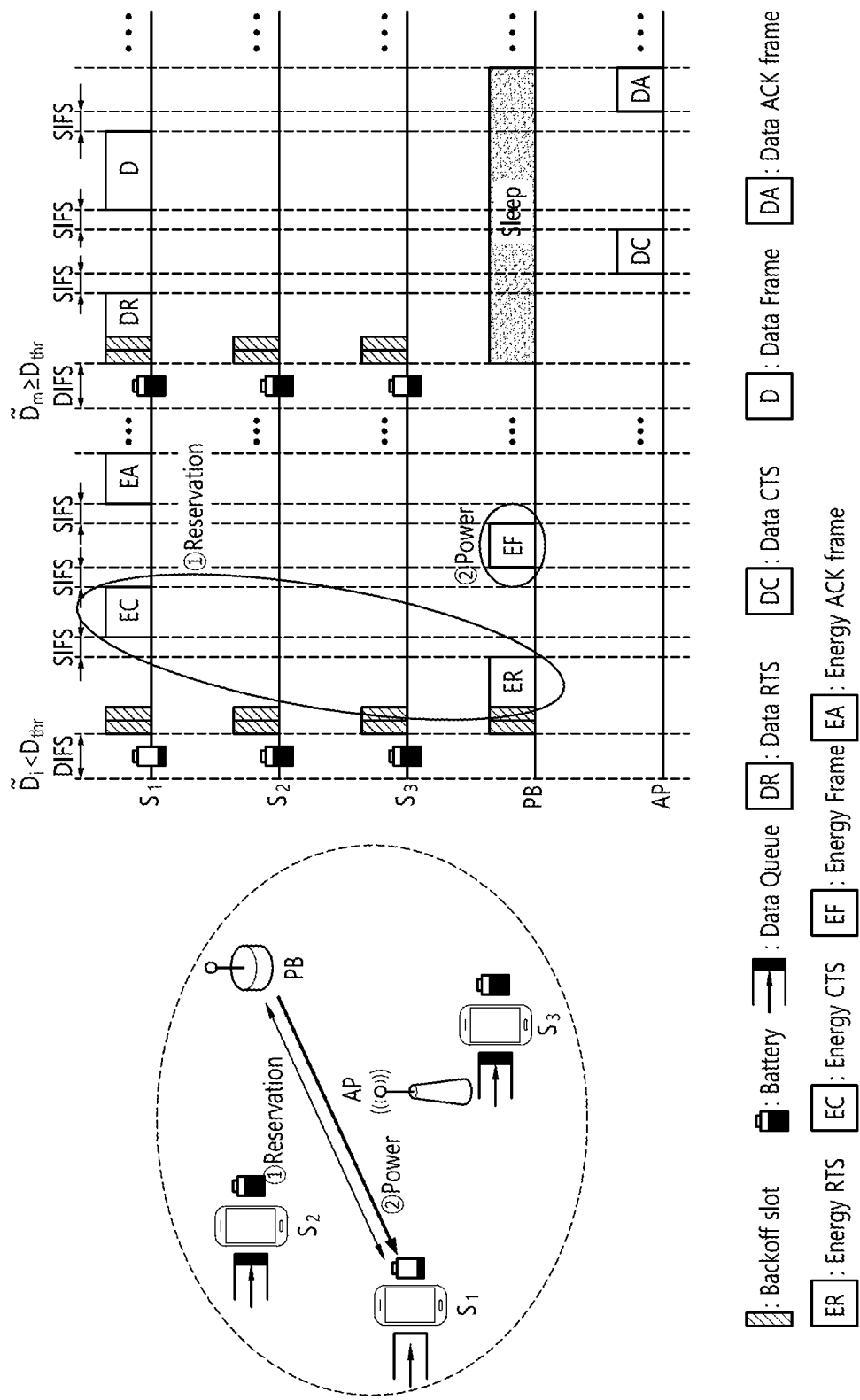
FIG. 4 is a diagram illustrating a data transmission and wireless power transfer process when terminals are in an idle state according to the embodiment of the present invention.

FIG. 4 illustrates a data and wireless power transfer process when the channel is in the idle state according to the embodiment of the present invention. Referring to FIG. 4, the wireless power transfer apparatus PB estimates the channel as the idle state when the number of data communication times per time during a predetermined section is smaller than a predetermined minimum threshold $D_{thr}$ based on the previous communication record. Since $\tilde{D}_i$, the average number of data communication times up to an i-th slot time of the terminals $S_1$, $S_2$, and $S_3$ is smaller than $D_{thr}$, PB estimates the channel as the idle state and transfers the power to the terminals. In this case, since the residual energy of the terminal $S_1$ is less than the low threshold $E_L$, the wireless power transfer apparatus concentrates and transfers the energy onto $S_1$ in the unicast mode. In addition, when it is estimated that the channel is in the busy state because a value of $\tilde{D}_m$ is larger than $D_{thr}$ for the m-th slot time, the wireless power transfer apparatus PB determines not to perform the DCF based contention for acquiring an energy frame transmission opportunity since the number of wireless communication terminals transmitting the data is large. Only when the terminals less attempt to transmit the data and transfer the power only in the case where it is estimated that the channel is in the idle state, an influence which the time of transmitting the ERTS/ECTS, and the like exerts on the communication of the wireless communication terminal may be minimized in order to transfer the energy.

According to yet another aspect of the present invention, the present invention may provide a method in which the wireless power transfer apparatuses effectively supply the power to the terminals through the cooperative power transfer method when there are a plurality of wireless power transfer apparatuses.

In the wireless powered communication network, when a power transfer time increases, the data transmission time relatively decreases as much, and as a result, the throughput of the network decreases. On the contrary, if the power transfer time may not be sufficiently secured, the amount of energy which is charged in the terminals decreases. Accordingly, in order to improve the throughput, it is important to effectively transfer the energy to the terminal.

When there are the plurality of wireless power transfer apparatuses, if the wireless power transfer apparatuses cooperate with each other to simultaneously transmit the power signal to the terminals, the energy may be effectively transferred to the terminal while decreasing the power transfer time.

The peripheral wireless power transfer apparatuses detects the channel in order to join in the DCF based contention and a specific wireless power transfer apparatus won in the contention to receive exchanging ERTS and ECTS frames with the AP. Thereafter, the corresponding wireless power transfer apparatuses may perform cooperative wireless power transfer of simultaneously transmitting the energy frame.

Figure 5:
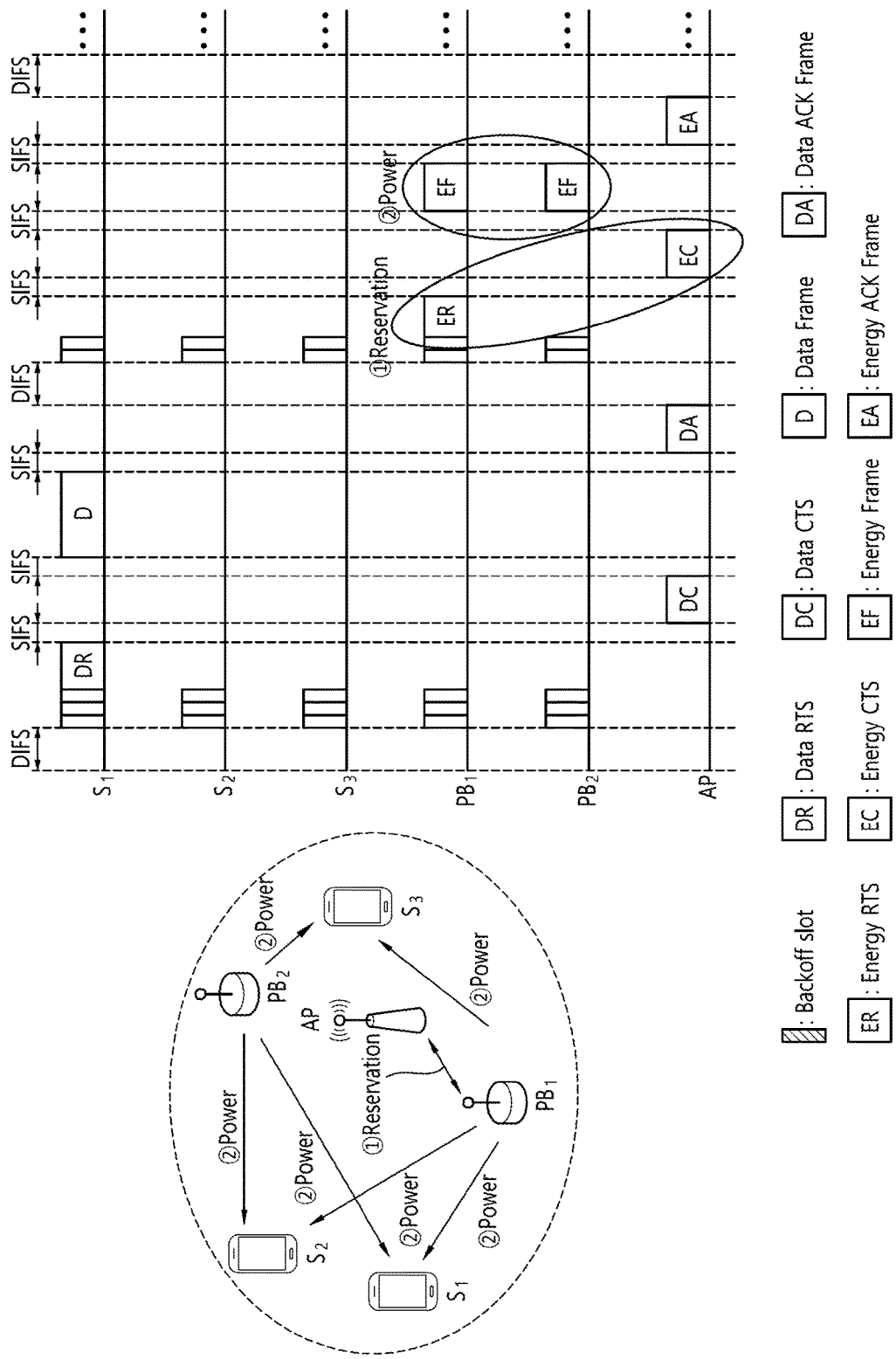
FIG. 5 is a diagram illustrating a cooperative power transfer method of wireless power transfer apparatuses according to the embodiment of the present invention.

FIG. 5 illustrates a data transmission and wireless power transfer process of the present invention when there are a plurality of wireless power transfer apparatuses. In FIG. 5, the number of communication terminals, $N_{STA}$ is 3 and the number of wireless power transfer apparatuses, $N_{PE}$ is 2. Referring to FIG. 5, the terminals $S_1$, $S_2$, and $S_3$ and the wireless power transfer apparatuses $PB_1$ and $PB_2$ content with each other based on the DCF in order to transmit the data or the energy frame similarly to the environment in FIG. 2. When the backoff value of $PB_1$ reaches 0 and the ERTS and ECTS exchange is thus performed with the AP, $PB_2$ may detect that $PB_1$ performs the ERTS and ECTS exchange. Therefore, when $PB_1$ transmits the energy frame, $PB_2$ also transmits the energy frame together with $PB_1$.

Figure 6A:
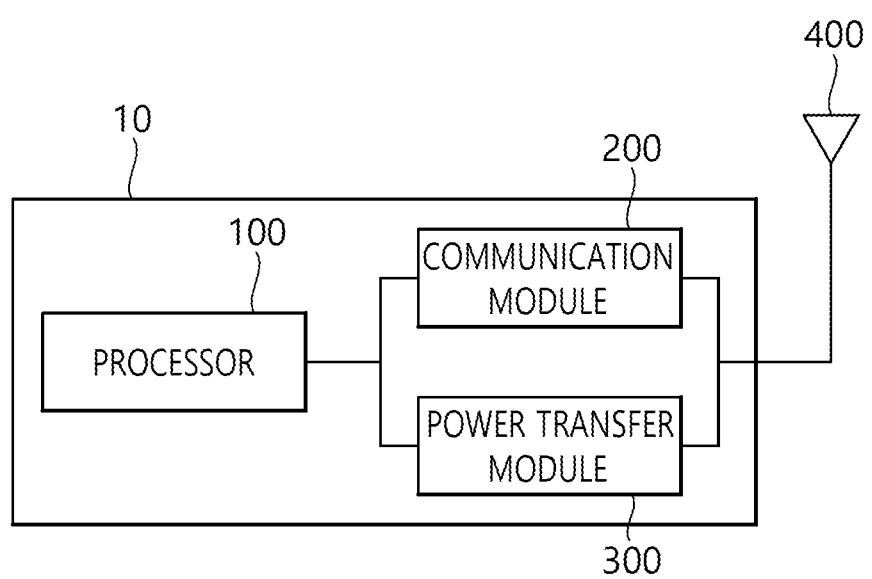
FIG. 6A is a schematic block diagram of a wireless power transfer apparatus according to an embodiment of the present invention.

FIG. 6A is a schematic block diagram of a wireless power transfer apparatus according to an embodiment of the present invention. Referring to FIG. 6A, a wireless power transfer apparatus 10 includes a processor 100, a communication module 200, a power transfer module 300, and an antenna 400.

The processor 100 controls the communication module 200 and the power transfer module 300 to determine whether to perform the DCF contention, the time of transmitting the control frame or the energy frame, and the like according to the embodiments of the present invention.

The processor 100 may be a universal processor, a special-purpose processor, a conventional processor, a digital signal processor (DSP), a microprocessor, one or more microprocessors associated with a DSP core, a controller, a microcontroller, application specific integrated circuits (ASICs), field programmable gate array (FPGA) circuits, an integrated circuit (IC), a state machine, and the like.

The communication module 200 transmits or receives a radio frequency signal to or from an AP or a wireless communication terminal through the antenna 400. Further, functions including detection of the wireless medium, execution of the DCF contention, transmission and reception of the control frame, and the like according to the embodiments of the present invention are performed.

The power transfer module 300 generates the energy frame and transmits the generated energy frame to the wireless communication terminals through the antenna 400.

The antenna 400 may be an antenna that is configured to transmit and/or receive radio signals including the control frame, the energy frame, and the like.

Figure 6B:
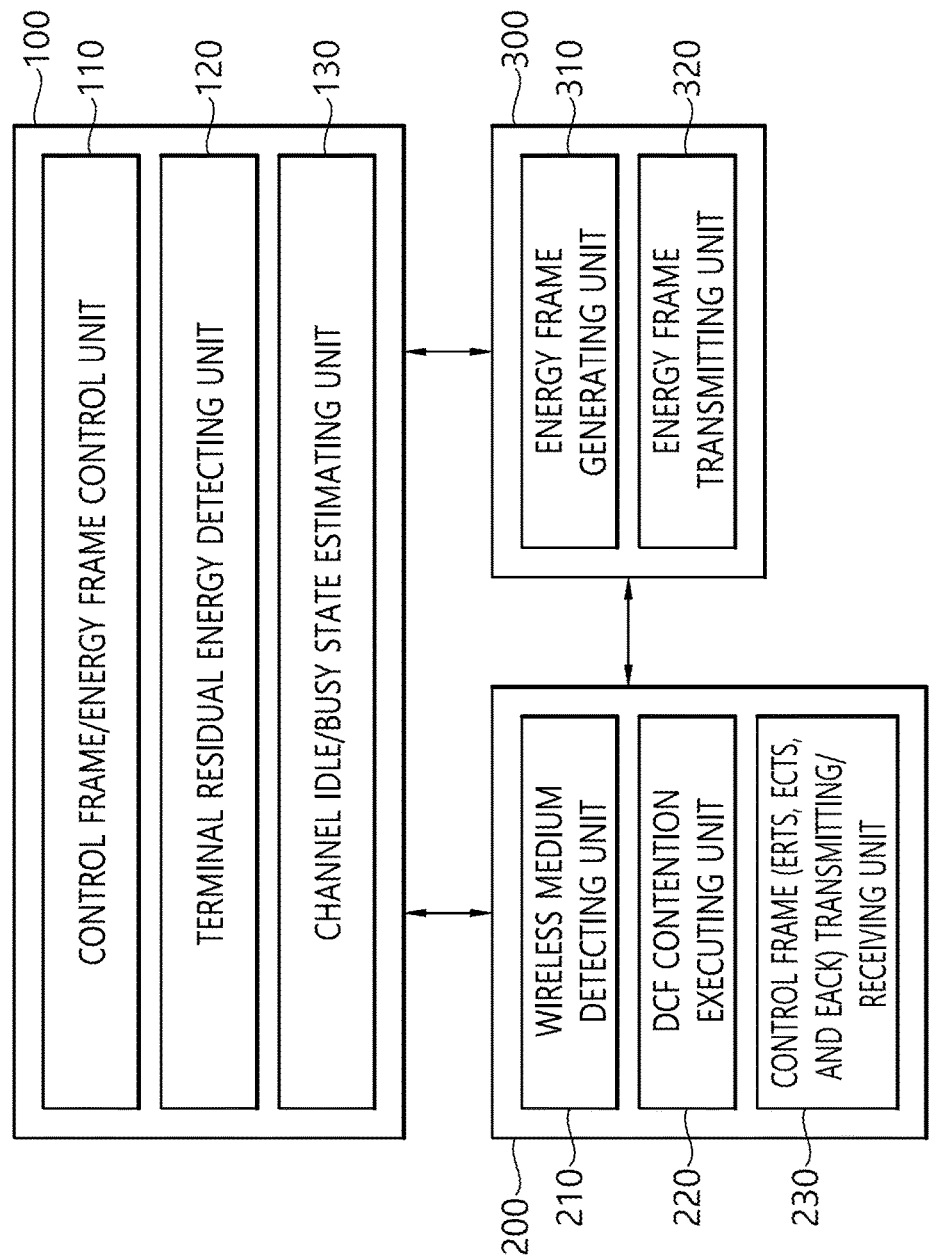
FIG. 6B is a detailed block diagram of the wireless power transfer apparatus according to the embodiment of the present invention.

FIG. 6B is a detailed block diagram of the wireless power transfer apparatus according to the embodiment of the present invention. Referring to FIG. 6B, a wireless power transfer apparatus 10 according to an embodiment of the present invention may include the processor 100, the communication module 200, and the power transfer module 300 and each part may include the following components.

The processor 100 may include a control frame/energy frame control unit 110, a terminal residual energy detecting unit 120, and a channel idle/busy state estimating unit 130.

The control frame/energy frame control unit 110 controls the communication module 200 and the power transfer module 300 and when it is detected that there is a terminal in which the energy is equal to or lower than a predetermined level through the terminal residual energy detecting unit 120, the control frame/energy frame control unit 110 controls the communication module 200 to transmit/receive the control frame for a power transfer operation. In this case, the control frame/energy frame control unit 110 determines a power transfer mode (energy broadcast or energy unicast) of the wireless power transfer apparatus 10 through interaction with the terminal residual energy detecting unit 120. The control frame/energy frame control unit 110 transfers an address of a specific terminal (alternatively, AP) to a control frame transmitting/receiving unit 230 of the communication module 200 to control a receiver address of the ERTS frame to be set. The control frame/energy frame control unit 110 transfers the address of the AP to the control frame transmitting/receiving unit 230 when the power transfer mode is the energy broadcast and transfers the address of the corresponding terminal to the control frame transmitting/receiving unit 230 when the power transfer mode is the energy unicast mode. When the control frame/energy frame control unit 110 recognizes that control frame exchange (that is, ERTS/ECTS frame exchange) between the wireless power transfer apparatus 10 and a target terminal (alternatively, AP) is completed through the control frame transmitting/receiving unit 230, the control frame/energy frame control unit 110 controls the power transfer module 300 to generate and transmit the energy frame. The control frame/energy frame control unit 110 sets the length of the energy frame and transfers the set length to the power transfer module 300 and the communication module 200 to control the energy amount charged in the terminal.

The terminal residual energy detecting unit 120 detects residual energy of the wireless communication terminals with beacon frame information received from the AP. This is used for the control frame/energy frame control unit 110 to determine the power transfer mode (energy broadcast or energy unicast) of the wireless power transfer apparatus 10 according to the residual energy states of the terminals.

The channel idle/busy state estimating unit 130 determines whether the channel is in the idle state based on the previous communication records of the terminals (see Equation 1). As a result, when it is estimated that the channel is in the idle state because the number of available communication terminals is small, the wireless power transfer apparatus 10 performs the operation of the power transfer module 300 through the communication module 200. However, when it is estimated that the channel is in the busy state because the number of available communication terminals is large, the wireless power transfer apparatus 10 restricts the operations of the communication module 200 and the power transfer module 300.

The communication module 200 includes a wireless medium detecting unit 210, a DCF contention executing unit 220, and the control frame (ERTS, ECTS, and EACK) transmitting/receiving unit 230.

The wireless medium detecting unit 210 checks whether the channel is in the idle state before the wireless power transfer apparatus 10 executes the DCF based contention.

The DCF contention executing unit 220 selects a random integer and selects the selected integer as the backoff value within a contention window and when the wireless medium detecting unit 210 confirms that the channel is continuously in the idle state, the DCF contention executing unit 220 reduces the backoff value. When the backoff value of the wireless power transfer apparatus 10 is 0, the wireless power transfer apparatus 10 obtains an opportunity to access the wireless medium. When the DCF contention executing unit 220 receives a notice that the control frame exchange or the energy frame transmission is unsuccessful from the control frame transmitting/receiving unit 230, the DCF contention executing unit 220 increases the size of the contention window to two times. When the DCF contention executing unit 220 receives a notice that the control frame exchange or the energy frame transmission is successful from the control frame transmitting/receiving unit 230, the DCF contention executing unit 220 sets the size of the contention window to an initial contention window size.

The control frame transmitting/receiving unit 230 transmits or receives the ERTS, ECTS, and energy ACK frames. The control frame transmitting/receiving unit 230 generates the ERTS frame when receiving a signal to access the wireless medium from the DCF contention executing unit 220. The control frame transmitting/receiving unit 230 sets the address of a given specific terminal (alternatively, AP) to a receiver address of the ERTS frame and sets a time required for the control frame/energy frame control unit 110 to transmit a given energy frame to a network allocation vector (NAV) value and transmits the ERTS frame. The control frame transmitting/receiving unit 230 waits for receiving the ECTS frame for a predetermined time after transmitting the ERTS frame and a transmitting address of the ECTS frame needs to be the same as a receiving address of the ERTS frame and the receiving address of the ECTS frame needs to be the same as the address of the wireless power transfer apparatus 10. When the control frame transmitting/receiving unit 230 receives the ECTS frame which satisfies the condition within a predetermined time, the signal indicating that the control frame exchange is successfully completed is transmitted to the control frame/energy frame control unit 110 and the power transfer module 300 to transmit the energy frame. When the control frame transmitting/receiving unit 230 receives a signal indicating that the energy frame transmission is completed from the power transfer module 300, the control frame transmitting/receiving unit 230 waits for receiving the energy ACK frame.

When the control frame transmitting/receiving unit 230 receives the energy ACK frame within a predetermined time, the control frame transmitting/receiving unit 230 notifies that the energy frame transmission is successfully completed to the processor 100, the DCF contention executing unit 220, and the power transfer module 300. When the control frame transmitting/receiving unit 230 may not receive the energy ACK frame within a predetermined time, the control frame transmitting/receiving unit 230 notifies that the energy frame transmission is unsuccessful to the processor 100, the DCF contention executing unit 220, and the power transfer module 300. When the control frame transmitting/receiving unit 230 may not receive the ECTS frame within a predetermined time after transmitting the ERTS frame, the control frame transmitting/receiving unit 230 notifies that the control frame exchange is unsuccessful to the DCF contention executing unit 220 and the wireless medium detecting unit 210 in order to attempt to access the wireless medium again.

Last, the power transfer module 300 may include an energy frame generating unit 310 and an energy frame transmitting unit 320.

The energy frame generating unit 310 generates the energy frame which the wireless power transfer apparatus will transfer to the terminal. The length of the energy frame generated by the energy frame generating unit 310 is determined by a length value of the energy frame given in the control frame/energy frame control unit 110.

The energy frame transmitting unit 320 executes an operation of transmitting the generated energy frame according to the power transfer mode determined by the processor 100.

Figure 7:
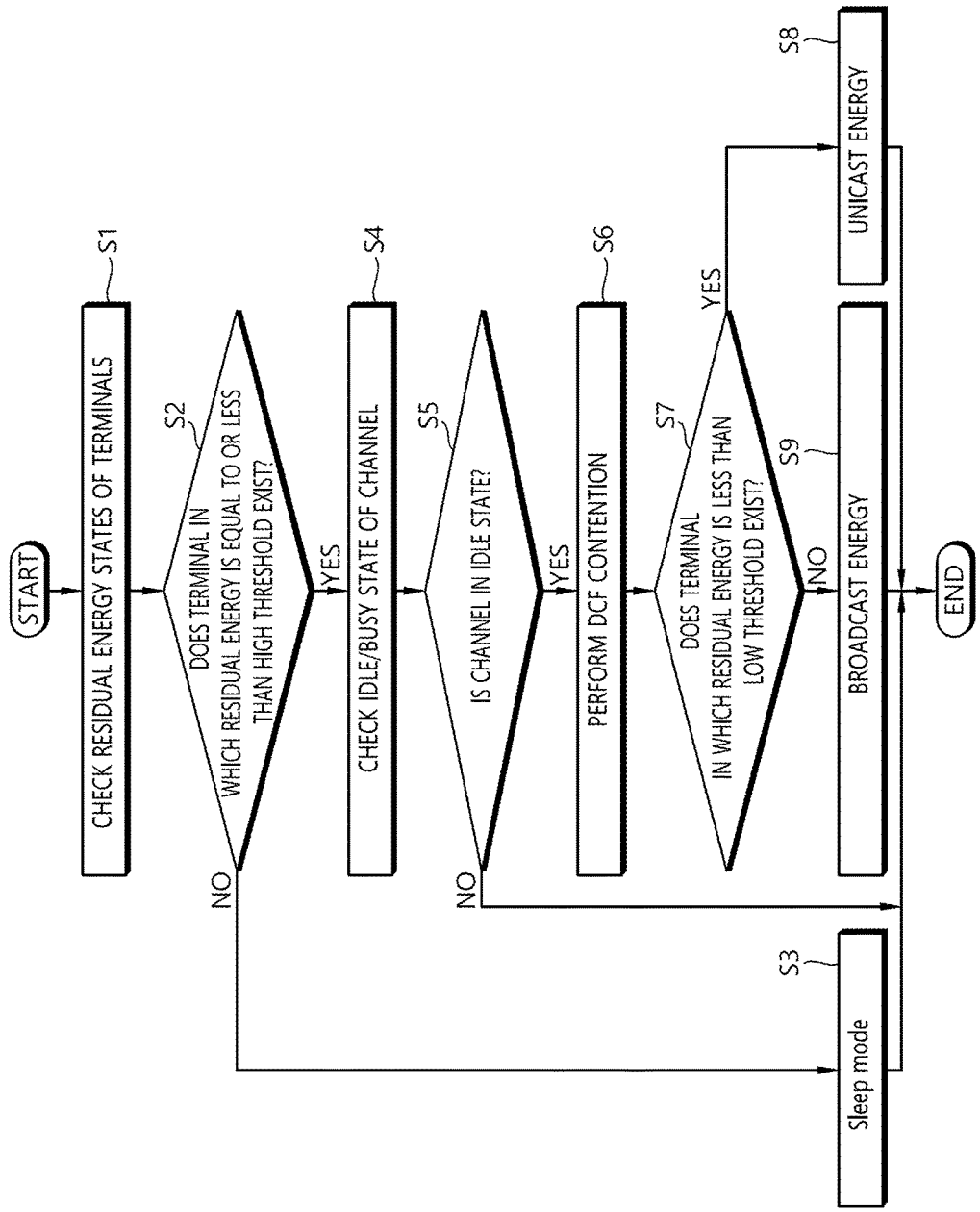
FIG. 7 is a flowchart of a power transfer method of a wireless power transfer apparatus according to an embodiment of the present invention.

FIG. 7 is a flowchart schematically illustrating a power transfer method of a wireless power transfer apparatus according to an embodiment of the present invention. Referring to FIG. 7, the wireless power transfer apparatus confirms the residual energy of the terminals before transferring the power (S1).

Then, it is determined whether there is a terminal having an energy amount equal to or less than a high threshold.

When there are one or more terminals having the energy amount equal to or less than the high threshold, the idle/busy state of the channel is estimated based on the previous data communication records of the terminals (S4).

When the residual energy of all terminals is more than the high threshold, the wireless power transfer apparatus does not operate (S3). When terminals having the energy amount equal to or less than the high threshold exist through data communication, the wireless power transfer apparatus resumes the operation to estimate the idle/busy state of the channel (S4).

As a result of estimating the idle/busy state of the channel, it is determined whether the channel is in the idle state (S5). When it is determined that the channel is in the idle state, the wireless power transfer apparatus performs the DCF based contention to perform power transfer (S6). However, when it is determined that the channel is not in the idle state (that the channel is in the busy state), the wireless power transfer apparatus does not perform the DCF based contention. Last, the wireless power transfer apparatus confirms whether there is a terminal having the residual energy less than a lower threshold in order to determine the mode to transfer the power (S7).

When there is the terminal having the residual energy less than the low threshold, the wireless power transfer apparatus concentrates the energy on the corresponding terminal (when there are two or more terminals having the residual energy less than the low threshold, a terminal having a lowest energy state among the terminals) and transfers the energy to the corresponding terminal in the unicast mode (S8) and when there is no terminal having the residual energy than the low threshold, the wireless power transfer apparatus transfers the energy to all terminals in the broadcast mode (S9).

Performance Evaluation Experiment Example

The throughput performance in each of the wireless powered communication network to which the control method of the wireless power transfer apparatus is applied and the wireless power communication network to which the related art is applied was measured. The throughput of the network is the same as a ratio of the time for which data is successfully transmitted to the AP to a total operation time. Therefore, the throughput may be expressed as shown in Equation 2.

$$\text{throughput} = \frac{(\text{successful data transmission time})}{(\text{total operation time})} \quad [\text{Equation 2}]$$

Parameters used in this simulation are shown in Table 1. MAC parameter values including the minimum contention window size W and the maximum backoff stage number m were set based on an IEEE 802.11 standard. In the simulation, an environment was assumed, in which the terminals are distributed on a circumference having a radius of 5 m at a regular interval based on the wireless power transfer apparatus and the AP. Since the terminal has an energy storage device therein, the terminal keeps the energy supplied from the wireless power transfer apparatus in the energy storage device. The terminal consumes a predetermined amount of energy in the energy storage device at the time of transmitting the data. The power $P_{RX}$ received by the terminal was calculated by considering a path attenuation based on an actual measurement result (see E. Ackerman, "Energous Readies Wireless Power Tech for Consumer Devices," IEEE Spectrum, January 2016) targeting a commercialized wireless power transfer system. Energy $E_{TX}$ consumed for data transmission of the terminal was calculated based on Wi-Fi transmission power of a smart phone terminal.

In the performance evaluation experiment of the present invention, terminals in which energy which remains in the energy storage device of the terminal is smaller than energy required for transmitting the data once does not join in the DCF contention for transmitting the data. The number $N_{PE}$ of wireless power transfer apparatuses was set to 5.

In the performance evaluation experiment in the related art, since all terminals possess sufficient energy in the energy storage device, all of the terminals continuously join in the DCF contention for transmitting the data. The number $N_{PE}$ of wireless power transfer apparatuses was set to 1 and the wireless power transfer apparatus was configured to generate and transmit the energy frame according to a Poisson process having a parameter $\lambda_{PE}$.

TABLE 1

| Parameter | Value | Parameter | Value |
| --- | --- | --- | --- |
| Packet payload | 8184 bits | Slot time | 50 μs |
| MAC header | 272 bits | SIFS | 28 μs |
| PHY header | 128 bits | DIFS | 128 μs |
| ACK length | 240 bits | Timeout | 300 μs |
| DRTS/ERTS | 288 bits | Data rate | 1 Mbps |
| DCTS/ECTS | 240 bits | W | 32 |
| m | 3 | $N_{PB}$ | 5 |
| $E_{TX}$ | 145 μJ | $P_{RX}$ | 75 mW |

Figure 8:
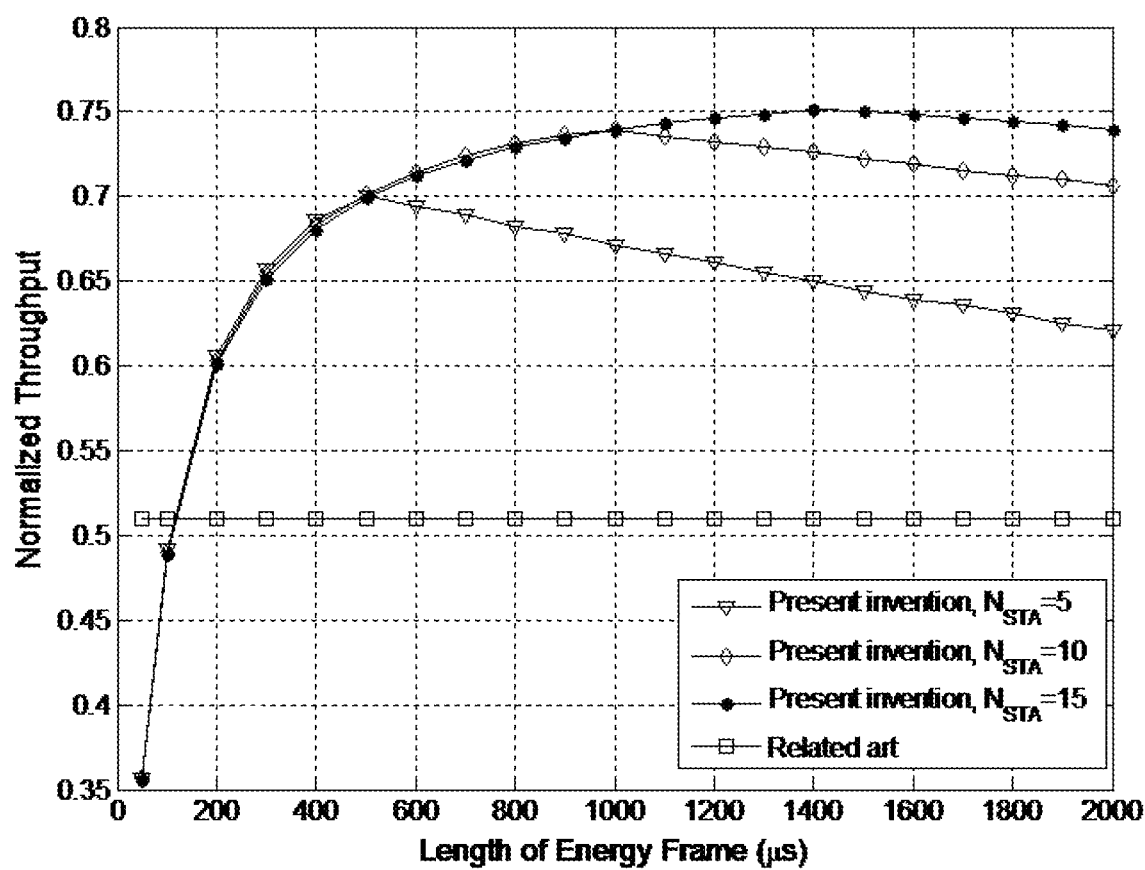
FIG. 8 is a performance experiment graph of a power transfer method of a wireless power transfer apparatus considering interference in wireless powered communication networks of the present invention.

FIG. 8 is a performance experiment graph of a power transfer method of a wireless power transfer apparatus considering interference in wireless powered communication networks of the present invention. In the performance experiment graph, the throughputs of the present invention and the related art are compared with each other in a situation in which the number $N_{STA}$ of terminals is 5, 10, and 15 under an IEEE 802.11 based wireless local area network (LAN) environment. In FIG. 8, in the case of $N_{STA}=5$, when the length of the energy frame is equal to or smaller than 50 μs, the throughput increases as the length of the energy frame increases. The reason is that the wireless communication terminals actively transmit the data by receiving sufficient power required for transmitting the data through the wireless power transfer apparatus and the reason for increasing the throughput in spite of increasing the length of the energy frame is that an interference influence which the wireless power transfer apparatus exerts on data frame transmission of the wireless power communication system is effectively removed through the method of the present invention. After the terminal reaches energy saturation, the throughput starts to decrease as the length of the energy frame increases. The reason is that since the wireless communication terminal may not transmit/receive the data for a time of transmitting the energy frame when the wireless power transfer apparatus succeeds in the DCF contention, the data transmission time corresponding to a numerator in Equation 2 for calculating the throughput is decreased, while the operation time of the terminal, which corresponds to a denominator is not changed. In the case of $N_{STA}=15$, the related art shows throughput performance which is lower than the present invention by 32%. The reason is that since the wireless power transfer apparatus may arbitrarily start transferring the power while the terminal transmits the data, data transmission/reception is interfered.

While an interference effect which the power transfer exerts the data transmission/reception is effectively controlled through the control method of the wireless power transfer apparatus of the present invention, the power required for the data transmission/reception is supplied to the wireless communication apparatus to enhance the throughput of the network.

The present invention has been described with reference to the embodiments. However, it will be appreciated by those skilled in the art that various modifications and changes of the present invention can be made without departing from the spirit and the scope of the present invention which are defined in the appended claims and their equivalents.

What is claimed is:

1. A control method for a wireless power transfer apparatus considering interference in wireless powered communication networks, the method comprising:
    performing, by at least one wireless power transfer apparatus, a distributed coordination function (DCF) based contention process with at least one wireless communication terminal;
    determining, by the wireless power transfer apparatus which won in the DCF based contention process, whether to transmit power to the at least one wireless communication terminal; and selectively transmitting, by the wireless power transfer apparatus, an energy frame to the at least one wireless communication terminal based on a result of the determining.

2. The method of claim 1, wherein the determining comprises:

transmitting, by the wireless power transfer apparatus which won in the DCF based contention process, an energy request-to-send (ERTS) frame to an access point (AP); and receiving, by the wireless power transfer apparatus which won in the DCF based contention process, an energy clear-to-send (ECTS) frame from the access point (AP) which received the ERTS frame.

3. The method of claim 2, further comprising:

switching, by the at least one wireless communication terminal which received at least one of the ERTS frame and the ECTS frame, a data transmission mode into an energy reception mode.

4. The method of claim 3, wherein the selective transmitting comprises:

transferring, by the wireless power transfer apparatus receiving the ECTS, power to the at least one wireless communication terminal.

5. A control method for a wireless power transfer apparatus considering interference in wireless powered communication networks, the method comprising:

determining, by at least one wireless power transfer apparatus, a residual energy state of at least one wireless communication terminal by a beacon frame which an AP periodically receiving the residual energy state from at least one wireless communication terminal periodically broadcasts;

performing, by the at least one wireless power transfer apparatus, a DCF based contention process with the at least one wireless communication terminal only when residual energy of all of the at least one wireless communication terminal is not more than a predetermined high threshold; and determining, by the wireless power transfer apparatus which won in the DCF based contention process, a power transfer mode according to the residual energy state of the at least one wireless communication terminal.

6. The method of claim 5, wherein in the determining of the power transfer mode, when at least one wireless communication terminal in which residual energy is less than a low threshold exists among the one or more wireless communication terminals, the power transfer mode is determined as an energy unicast mode, and when the residual energy of all of the one or more wireless communication terminals is equal to or more than the low threshold and equal to or less than a high threshold, the power transfer mode is determined as an energy broadcast mode.

7. The method of claim 5, further comprising:

transmitting, by the wireless power transfer apparatus which won in the DCF based contention process, an energy request-to-send (ERTS) frame to an access point (AP) before transferring power; and receiving, by the wireless power transfer apparatus which won in the DCF based contention process, an energy clear-to-send (ECTS) frame from the access point (AP) which received the ERTS frame.

8. The method of claim 1, wherein, with α being a real number weighted value between 0 and 1, the at least one wireless power transfer apparatus estimates a channel busy state $\tilde{D}_i$ by the at least one wireless communication terminal based on $$\tilde{D}_i = \alpha \tilde{D}_{i-1} + (1-\alpha)D_i, \text{ and}$$

wherein the at least one wireless power transfer apparatus performs the DCF based contention process with the at least one wireless communication terminal only when the $\tilde{D}_i$ value is smaller than a predetermined minimum threshold.

9. The method of claim 2, further comprising:

transmitting, by residual wireless power transfer apparatuses other than the wireless power transfer apparatus which won in the DCF based contention among the one or more wireless power transfer apparatuses, an energy frame to at least one wireless communication terminal simultaneously with the wireless power transfer apparatus which won in the DCF based contention process by detecting the ERTS frame and ECTS frame exchange.

10. A control method for a wireless power transfer apparatus considering interference in wireless powered communication networks, the method comprising:

confirming, by at least one wireless power transfer apparatus, residual energy of at least one wireless communication terminal;

determining, by the at least one wireless power transfer apparatus, whether a wireless communication terminal in which the residual energy is equal to or less than a high threshold exists;

estimating, by the at least one wireless power transfer apparatus, an idle or busy state of a channel when the wireless communication terminal in which the residual energy is equal to or less than the high threshold exists;

performing, by the at least one wireless power transfer apparatus, a DCF based contention process with the at least one wireless communication terminal when the channel is in the idle state;

determining, by a wireless power transfer apparatus which won in the DCF based contention process, whether a wireless communication terminal in which the residual energy is less than a low threshold exists;

determining, by the wireless power transfer apparatus which won in the DCF based contention process, a power transfer mode as an energy unicast mode when wireless communication terminal in which the residual energy is less than the low threshold exists; and determining, by the wireless power transfer apparatus which won in the DCF based contention process, a power transfer mode as an energy broadcast mode when wireless communication terminal in which the residual energy is less than the low threshold does not exist.

11. A wireless power transfer apparatus comprising:

a communication module configured to select any integer within a contention window and select the selected integer as a backoff value to perform a DCF based contention process with one or more wireless communication terminals;

a power transfer module configured to transmit an energy frame; and a processor configured to control the communication module to perform the DCF based contention process with the one or more wireless communication terminals, determine, based on the wireless power transfer apparatus having won in the DCF based contention process, whether to transmit power to at least one of the one or more wireless communication terminals, and selectively, based on a result of the determination, control the power transfer module to transmit the energy frame to the at least one of the one or more wireless communication terminals.

12. The wireless power transfer apparatus of claim 11, wherein the communication module includes a wireless medium detector configured to check whether a channel is in an idle state before performing the DCF based contention process, and a control frame transmitter/receiver configured to transmit an energy request-to-send (ERTS) frame to a wireless communication terminal or an access point (AP) and to receive at least one of an energy clear-to-send (ECTS) frame and an energy ACK (EACK) frame from the wireless communication terminal or the AP.

13. The wireless power transfer apparatus of claim 12, wherein the power transfer module includes, an energy frame generator configured to generate the energy frame, and an energy frame transmitter configured to transmit the energy frame.

14. A wireless power transfer apparatus comprising:

a communication module selecting any integer within a contention window and selecting the selected integer as a backoff value to perform a DCF contention based process with one or more wireless communication terminal;

a power transfer module transmitting an energy frame to at least one of the one or more wireless communication terminals when wining in the DCF based contention process; and a processor controlling the communication module and the power transfer module, wherein the communication module includes:

a wireless medium detecting unit checking whether a channel is in an idle state before performing the DCF based contention process;

a DCF contention executing unit executing the DCF based contention process; and a control frame transmitting/receiving unit transmitting an energy request-to-send (ERTS) frame to a wireless communication terminal or an access point (AP) and receiving at least one of an energy clear-to-send (ECTS) frame and an energy ACK (EACK) frame from the wireless communication terminal or the AP, wherein the power transfer module includes:

an energy frame generating unit generating an energy frame to be transmitted to at least one wireless communication terminal; and an energy frame transmitting unit transmitting the energy frame to at least one wireless communication terminal, wherein the processor includes:

a control frame/energy frame control unit determining a power transfer mode—the power transfer mode including an energy unicast mode and an energy broadcast mode;

a terminal residual energy detecting unit detecting a residual energy state of at least one wireless communication terminal by beacon frame information received from the AP; and a channel idle/busy state estimating unit determining whether the channel is in the idle state based on a previous communication record of the at least one wireless communication terminal.

15. The wireless power transfer apparatus of claim 14, wherein the control frame/energy frame control unit determines the power transfer mode as the energy unicast mode when at least one wireless communication terminal in which residual energy is less than a low threshold exists among one or more wireless communication terminals as a result of detecting the residual energy state of the terminal residual energy detecting unit and determines the power transfer mode as the energy broadcast mode when the residual energy of all of one or more wireless communication terminals is equal to or more than the low threshold and equal to or less than the high threshold.

16. The wireless power transfer apparatus of claim 15, wherein the control frame/energy frame control unit is configured to:

transfer to the control frame transmitting/receiving unit an address of a wireless communication terminal having a lowest residual energy among the wireless communication terminals in which the residual energy is less than the low threshold, receive the power when the power transfer mode is the energy unicast mode, and transfer the address of the AP to the control frame transmitting/receiving unit when the power transfer mode is the energy broadcast mode.

17. The wireless power transfer apparatus of claim 16, wherein when the control frame transmitting/receiving unit is not able to receive the ECTS frame within a predetermined time after transmitting the ERTS frame to the wireless communication terminal or the AP which will receive the power, the control frame transmitting/receiving unit notifies that control frame exchange is unsuccessful to the DCF contention executing unit and the wireless medium detecting unit in order to attempt to access a wireless medium again.

18. The wireless power transfer apparatus of claim 16, wherein when the control frame transmitting/receiving unit receives an energy ACK frame from the wireless communication terminal or the AP which will receive the power within a predetermined time, the control frame transmitting/receiving unit notifies that energy frame transmission is successfully completed to at least one of the processor, the DCF contention executing unit, and the power transfer module and when the control frame transmitting/receiving unit is not able to receive the energy ACK frame within the predetermined time, the control frame transmitting/receiving unit notifies that the energy frame transmission is unsuccessful to at least one of the processor, the DCF contention executing unit, and the power transfer module.

19. The wireless power transfer apparatus of claim 14, wherein, with α being a real number weighted value between 0 and 1, the channel idle/busy state estimating unit estimates a channel busy state $\tilde{D}_i$ by the at least one wireless communication terminal based on $\tilde{D}_i = \alpha \tilde{D}_{i-1} + (1-\alpha)D_i$, and estimates a case where the $\tilde{D}_i$ value is smaller than a predetermined minimum threshold as an idle state and estimates other cases as the busy state.

20. The wireless power transfer apparatus of claim 12, wherein the determination includes determining whether the ECTS of the EACK is received in response to transmission by the wireless power transfer apparatus of the ERTS in response to the wining in the DCF based contention process.

21. The wireless power transfer apparatus of claim 20, wherein the determination is further based on determined respective residual energy states of at least one wireless communication terminal of the one or more wireless communication terminals.

22. The wireless power transfer apparatus of claim 11, wherein the determination is further based on determined respective residual energy states of at least one wireless communication terminal of the one or more wireless communication terminals.

23. A wireless power transfer apparatus comprising:
   a communication module configured to select any integer within a contention window and select the selected integer as a backoff value to perform a DCF based contention process with one or more wireless communication terminals;
   a power transfer module configured to transmit an energy frame; and
   a processor configured to:
      control the communication module to perform the DCF based contention process with the one or more wireless communication terminals; and
      control the power transfer module to transmit the energy frame to the at least one of the one or more wireless communication terminals,
   wherein the communication module includes:
      a wireless medium detector configured to check whether a channel is in an idle state before performing the DCF based contention process; and
      a control frame transmitter/receiver configured to transmit an energy request-to-send (ERTS) frame to a wireless communication terminal or an access point (AP) and to receive at least one of an energy clear-to-send (ECTS) frame and an energy ACK (EACK) frame from the wireless communication terminal or the AP,
   wherein the power transfer module includes:
      an energy frame generator configured to generate the energy frame; and
      an energy frame transmitter configured to transmit the energy frame, and
   wherein the processor is further configured to:
      determine which of an energy unicast mode and an energy broadcast mode is a power transfer mode of the wireless power transfer apparatus;
      detect a residual energy state of at least one wireless communication terminal by beacon frame information received from the AP; and
      determine whether the channel is in the idle state based on a previous communication record of the at least one wireless communication terminal.

24. The wireless power transfer apparatus of claim 23, wherein, to determine the power transfer mode, the processor is configured to
   determine the power transfer mode to be the energy unicast mode when at least one wireless communication terminal in which residual energy, as a result of the detecting of the residual energy state, is less than a low threshold exists among the one or more wireless communication terminals, and
   determine the power transfer mode to be the energy broadcast mode when respective residual energies of all of the one or more wireless communication terminals are equal to or more than the low threshold and equal to or less than the high threshold.

* * * * *